United States Patent [19]
Griste

[11] 3,771,746
[45] Nov. 13, 1973

[54] FISHING REEL
[75] Inventor: Frederic S. Griste, Exton, Pa.
[73] Assignee: Penn Fishing Tackle Mfg. Co., Philadelphia, Pa.
[22] Filed: Aug. 23, 1971
[21] Appl. No.: 173,907

[52] U.S. Cl................. 242/215, 74/538, 192/93 B, 242/219
[51] Int. Cl............................................ A01k 89/00
[58] Field of Search................... 242/219, 221, 215; 192/93 B, 93 R, 48.9, 48.91; 74/358

[56] References Cited
UNITED STATES PATENTS
1,693,645  12/1928  Fahrney.................. 192/48.9 X
3,425,644   2/1969  Griste..................... 242/221 X
1,542,403   6/1925  Miles..................... 242/215

FOREIGN PATENTS OR APPLICATIONS
416,059  9/1934  Great Britain............... 242/215
541,888  1/1932  Germany.................... 74/358

Primary Examiner—Billy S. Taylor
Attorney—Zachary T. Wobensmith, 2nd

[57] ABSTRACT

A fishing reel having a positive lever control of the spool speed whereby two speeds of spool rotation are attained. The spool shaft has a driving gear thereon with which a drive gear is in continuous engagement. A pair of gears are provided at each end of a lever and cam controlled tilt plate and engagable alternately for driving the drive gear directly for high speed operation and indirectly through another gear for low speed operation.

4 Claims, 7 Drawing Figures

INVENTOR
FREDRIC S. GRISTE

BY

ATTORNEY

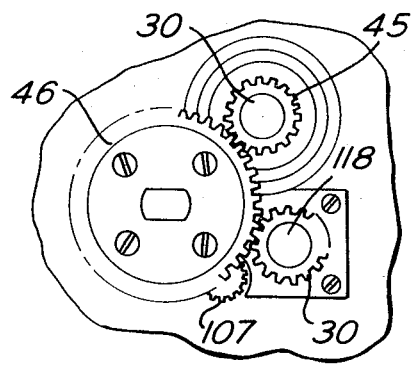
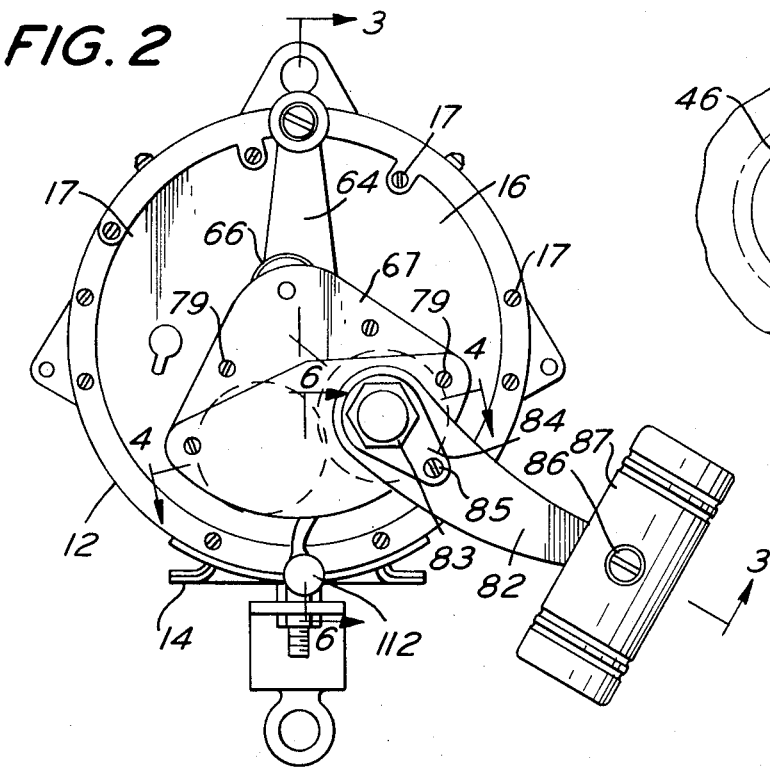
FIG. 2
FIG. 5
FIG. 4
INVENTOR
FREDRIC S. GRISTE
ATTORNEY

FISHING REEL

BACKGROUND OF THE INVENTION

1. Field of the Invention

This invention relates to a fishing reel of the two speed type with a lever controlled gear shifting mechanism.

2. Description of the Prior Art

Multi speed fishing reels of the shifting gear type are well known in the art.

This type of reel is especially useful when it is imperative to reel the line in quickly and easily when it is slack and at a speed that would be unnecessary or undesirable for normal winding operation and would require too much manual effort.

The mechanisms usually employed are fragile, do not operate easily, are prone to jam and suffer from other operating difficulties.

The fishing reel of the present invention does not have these shortcomings but provides a choice of two speeds of spool rotation both quickly and easily selected with movement of a control lever.

SUMMARY OF THE INVENTION

In accordance with the invention a fishing reel is provided with the spool operable at either of two predetermined speeds of rotation, and this is accomplished by the use of a driving gear on the spoolshaft with which a drive gear is in continuous engagement, a pair of gears on a lever and cam controlled tilt plate which effect driving of the drive gear directly for high speed operation and indirectly through another gear for low speed operation, the lever being readily accessible exteriorly for quick shifting from one speed to the other.

The principal object of the invention is to provide a fishing reel having two speeds of spool rotation.

A further object of the invention is to provide a fishing reel whereby the speeds of spool rotation may be easily selected.

A further object of the invention is to provide a fishing reel of the character aforesaid which does not have operating difficulties.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 2 is an end elevational view of the fishing reel of FIG. 1;

FIG. 4 is a fragmentary horizontal sectional view, enlarged, taken approximately on the line 4—4 of FIG. 2;

FIG. 5 is a fragmentary vertical sectional view taken approximately on the line 5—5 of FIG. 3;

Figure 1:
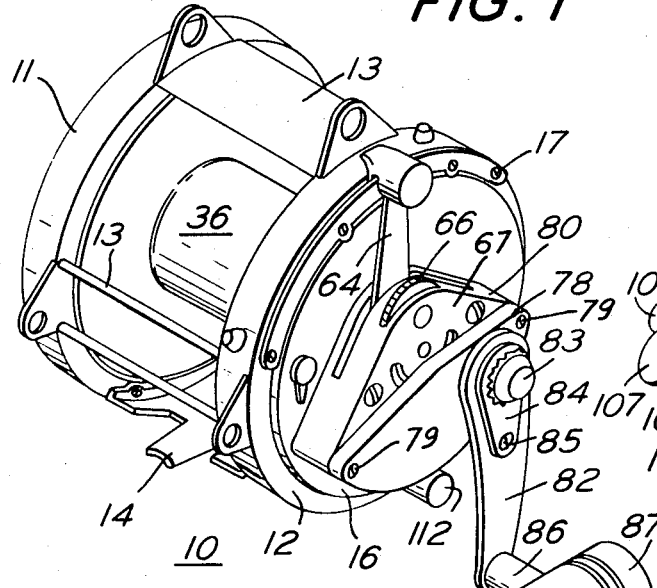
FIG. 1 is a view in perspective of a fishing reel in accordance with the invention.
Figure 7:
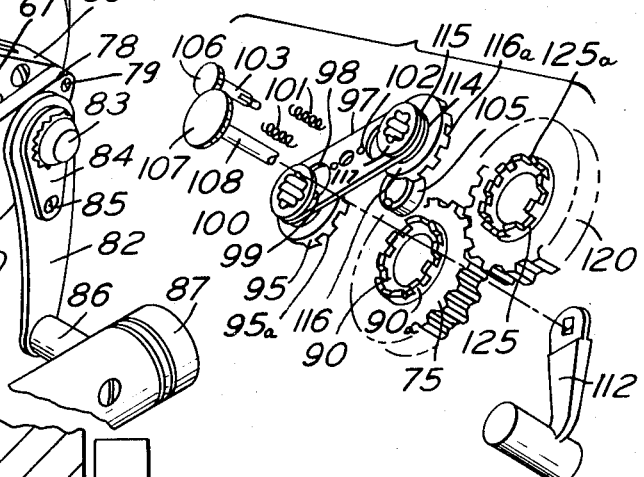
FIG. 7 is an exploded perspective view illustrating a portion of the apparatus of the invention.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to FIGS. 1 to 4 of the drawings a reel frame is shown at 10 having side rings 11 and 12 connected by frame posts 13, and with a reel stand 14 carried thereby. The side rings 11 and 12 have side plates 15 and 16 integral therewith. The side plates 15 and 16 are held in assembled relation to the frame posts 13 and reel stand 14 by screws 17.

The side plate 15 has a bearing 18 carried thereby which supports the hub 19 of an outer drive plate 20. The drive plate 20, on the same side thereof as the hub 19 has a side rim 21 provided with a plurality of interior peripheral shoulders 22 with guide surfaces (not shown) therebetween (see FIG. 3).

The side plate 15 on the interior thereof has a plurality (not shown) of dogs carried on pivot pins (not shown) and normally urged outwardly by springs (not shown) which extend around the outside of the bearing 18 and are clamped in place by screws (not shown). The dogs (not shown) engage the shoulders 22 to prevent the drive plate 20 from rotating in one direction.

The drive plate 20 has interior splines 28 for slidable engagement by complemental splines 29 of a shaft 30.

An inner drive plate 20a is provided having a hub 19a with interior splines 28a for slidable engagement on the splines 29.

Each of the drive plates 20 and 20a has a drag washer 31 secured thereto by screws 32 and each washer 31 carries a friction ring 33. Interposed between the friction rings 33, a brake disc 34 is provided, slidably carried by mounting pins 35 which are secured in a spool 36.

Interposed between the outer and inner drive plates 20 and 20a, and carried on the spline portion 29, a compression spring 37 is mounted which normally urges the plates 20 and 20a apart. The shaft 30 has, at spaced locations thereon, spool supporting bearings 38 and 39 which engage internal shoulders 40 and 41 of the spool 36.

A drag cover ring 42 can be provided carried by the spool 36. The shaft 30 has an integral pinion 45 with which a drive gear 46 on a drive shaft 47 is in continuous engagement.

The gear 46 has a much larger pitch diameter than pinion 45. A relatively stiff spring 48, such as Belleville spring washer, is interposed between the pinion 45 and the inner race of the bearing 39.

The longitudinal axial position of the shaft 30 and accordingly of the spool 36 is controlled by structure as shown in the U. S. patent to Henze, No. 3,478,979. The end of the shaft 30, outwardly beyond the pinion 45, is carried in a bearing 60.

The bearing 60 is seated within a cup shaped bearing carrier 61 which has radial pins 62 engaged in the side plate 16.

The bearing 60 has a bearing positioning member 63, secured thereto and longitudinally axially movable by a brake control lever 64 acting as shown in U.S. Pat. No. 3,478,979.

A coarse and fine adjustment wheel 66 is provided, mounted in plate 67, with a gear 68 thereon engaged with a gear 69 on shaft 65 journaled in plate 67 and engaged with positioning member 63 for brake adjustment and wear take-up.

The drive shaft 47 is journaled in bearing 70, mounted in block 71 which is secured to plate 16 by screws (not shown). The shaft 47 has splines 72 thereon inwardly of bearing 70 and has a round reduced diameter portion 73 journaled in bearing 74 which is carried in gear 75. The gear 75 has a hub 76 journaled in bearing 77 which is mounted in cover plate 78 secured by screws 79 to plate 16 and passing through frame block 80. The hub 76 has a threaded end 81 externally of frame block 78 and has a radial handle lever 82 secured thereto by nut 83, plate 84 and screws 85, which lever carries a pivot pin 86 on which a manually operable knob 87 is pivotally supported.

The gear 75 opposite threaded end 81 has a clutch 90 with axially extending teeth 90a. The shaft 47 has an internally splined clutch member 95 slidably carried on the splines 72. The clutch member 95 has axially extending teeth 95a engageable with the teeth 90a for connecting the clutch member 95 and shaft 47 for movement together.

The clutch member 95 is positioned along the splines 72 in or out of mesh with clutch 90 by a tilt plate 97 which has a slot 98 therein with shoulder 99 of clutch 90 rotatably engaged and retained in slot 98 by a rim 100.

The plate 97 is engaged by a pair of springs 101 in recesses 102 in plate 97 and in recesses 104 in plate 16. The plate 97 has a shaft 103 through the center with a circular cam 105 thereon and the shaft 103 is jounaled in frame block 80. The shaft 103 had a gear 106 thereon opposite to frame block 80 which is engaged with gear 107 on a shaft 108 which shaft extends through plate 16 to a plate 110 between cover plate 78 and frame blocks 80 and has a cam shaft lever 112 keyed thereon.

The plate 97 has a slot 114 in the end opposite to slot 98 with a shoulder 115 of clutch member 116 engaged therewith and retained in slot 114 by a rim 117.

The clutch member 116 has teeth 116a, is similar to clutch member 95 and is carried on splines 113 of a shaft 118. The shaft 118 is journaled in bearing 119 carried in gear 120. The gear 120 has a shaft 121 carried on bearing 122 which is carried in recess 123 of plate 78. The gear 120 is continuously meshed with gear 75 and has a clutch member 125 secured thereto with teeth 125a which may be engaged with teeth 95a of clutch member 95 if direct drive therethrough is desired. The shaft 118 is journaled in bearings 126 secured in frame blocks 127 and has a gear 130 secured thereto by screws 131 which gear 130 is meshed with gear 46. The gear 130 is of the same pitch diameter as pinion 45.

The mode of operation will now be pointed out.

The spool 36 is controlled for release of the line by the dogs (not shown) and by the positioning of control lever 64 and wheel 66.

For winding the line onto the spool 36, the speed of rotation imparted to the spool 36 by revolution of the lever 82 by knob 87 will be determined by the setting of the shift lever 112.

With the shift lever 112 in the position shown in FIG. 4, and with the cam 105 tilting the plate 97 as illustrated revolution of the lever 82 is effective to rotate the gear 75, the clutch 90 and its teeth 90a in engagement with the teeth 95a of the clutch 95, the clutch 95 being in engagement with the splines 72 on the shaft 47 to rotate drive gear 46 which by its engagement with pinion 45 rotates spool 36. The relation of pitch diameters of gear 46 and pinion 45 provides the faster speed.

Figure 6:
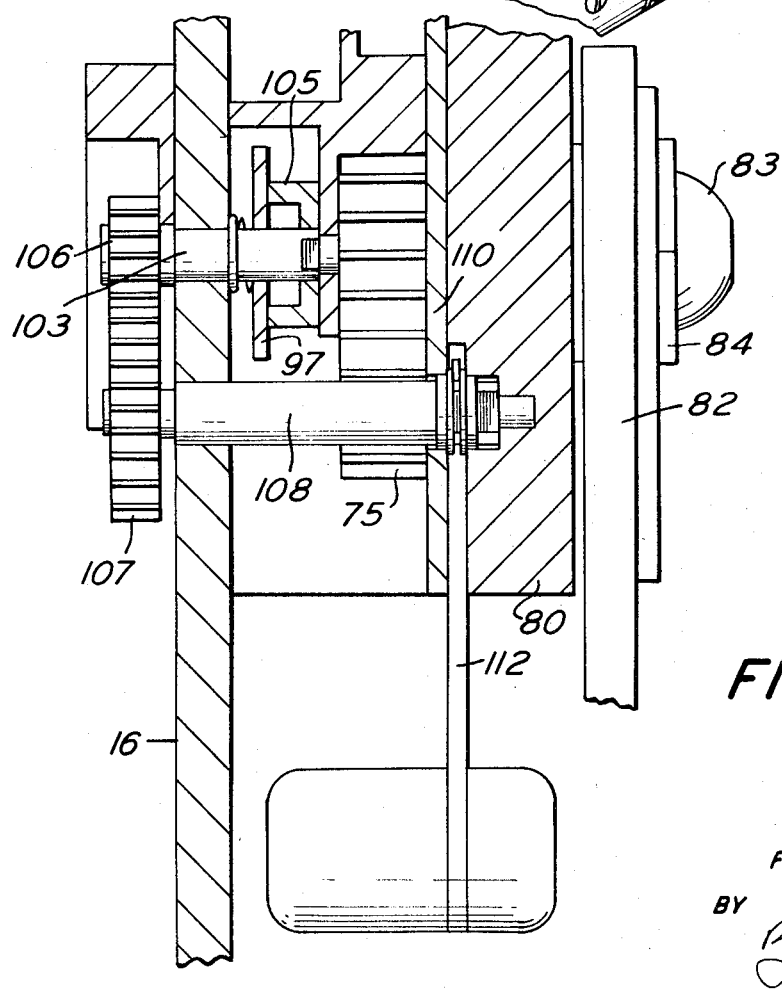
FIG. 6 is a fragmentary vertical sectional view, enlarged, taken approximately on the line 6—6 of FIG. 2.
Figure 3:
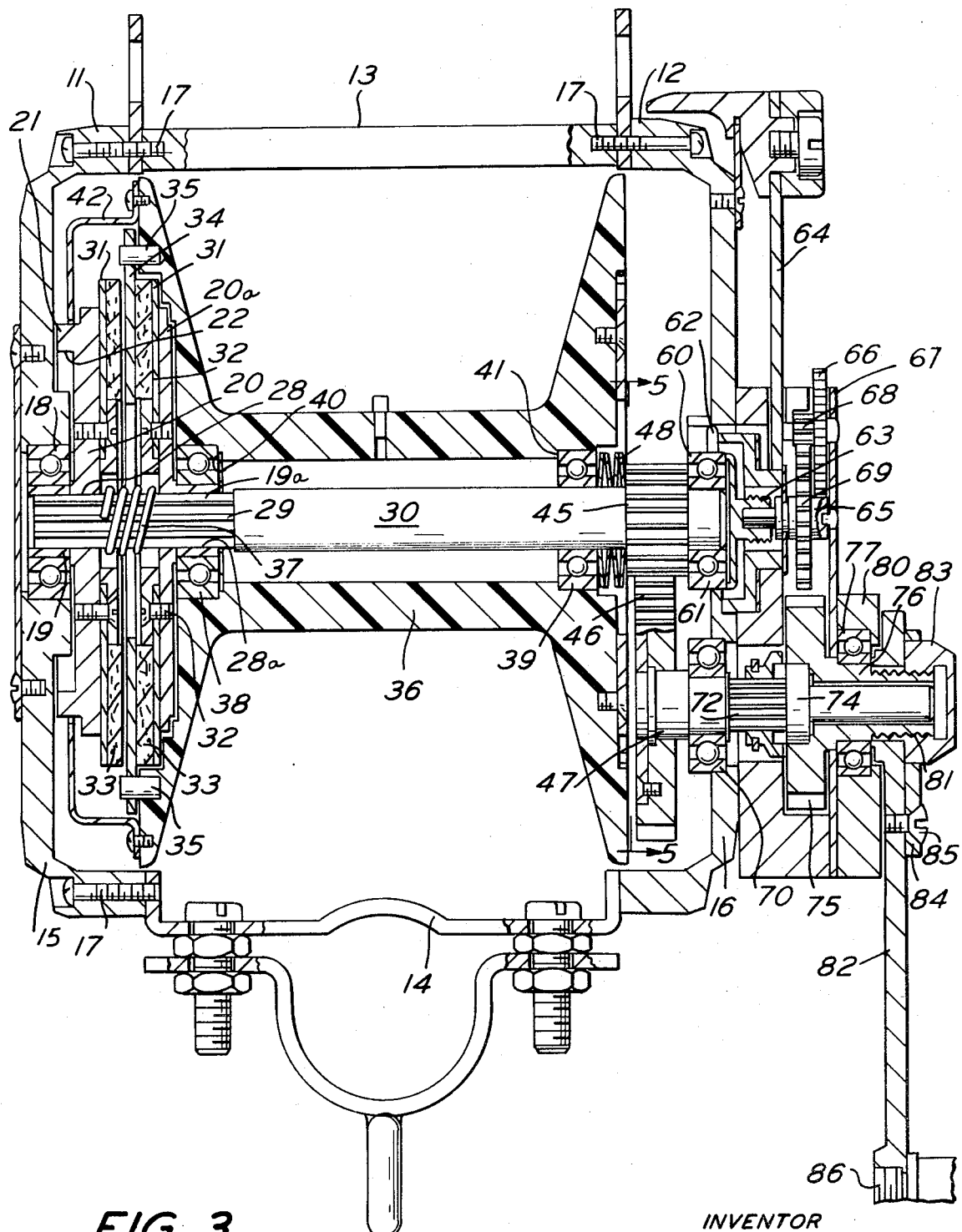
FIG. 3 is a vertical sectional view, enlarged, taken approximately on the line 3—3 of FIG. 2.

If now, low speed drive of the spool 36 is desired the shift lever 112 is revolved counterclockwise as seen in FIG. 2. This movement (see FIG. 6) through shaft 108, gear 107, gear 106, shaft 103 rotates the cam 105 to shift the tilt plate 97 to its opposite position. Tilting of the plate 97 causes disengagement of the teeth 95a from the teeth 90a, and engagement of the teeth 116a with the teeth 125a.

Revolution of the lever 82 is effective to rotate the gear 75 which is engaged with gear 120. The gear 120 carries the clutch 125 with its teeth 125a engaged with teeth 116a on clutch member 116. The clutch member 116, engaged with splines 113 on shaft 118 drives gear 130 which in turn drives gear 46. The relation of pitch diameters of gear 46 and gear 130 provides a step down or slower drive of the spool 36 for each revolution of the lever 82, than for the other setting of the shift lever 112.

The shifting from one speed to the other by movement of the shift lever 112 can be readily effected whenever desired, and with no difficulties in the shifting.

I claim:

1. A fishing reel comprising
   a frame having side plates,
   a spool rotatably mounted between said side plates,
   a shaft connected to said spool in driving relation thereto,
   a gear on said shaft,
   a drive gear in continuous engagement with said gear on said shaft,
   a revolvable driving member,
   means interposed between said shaft and said driving member for driving said spool at different selected speeds which means includes
   a shaft on which said drive gear is secured,
   a first additional shaft,
   a first additional gear secured on said additional shaft in continuous engagement with said drive gear,
   a second additional shaft,
   a second additional gear on said second additional shaft,
   said driving member having a gear driven thereby which is in continuous engagement with the gear on said second additional shaft, and
   shiftable means for selectively directly and indirectly driving said drive gear in accordance with the positioning of said shiftable means,
   said shiftable means including
      first clutch members one of which is slidably engageable with the other and which is continuously operable with said first additional gear and the other of which is secured to the gear on said second additional gear,
      second clutch members one of which is slidably engageable with the other and which is continuously operable with the drive gear and the other of which is secured to the gear on said driving member, and means for controlling the positioning of said slidably engageable members.

2. A fishing reel as defined in claim 1 in which
said shiftable means includes a manually operable actuating member,
a cam operated by said actuating member, and
a member positioned by said cam on which the movable clutch members are carried.

3. A fishing reel as defined in claim 1 in which
said driving member is manually operable.

4. A fishing reel comprising
a frame having side plates,
a spool rotatably mounted between said side plates,
a shaft connected to said spool in driving relation thereto,
a gear on said shaft,
a drive gear in continuous engagement with said gear on said shaft,
a revolvable driving member,
means interposed between said shaft and said driving member for driving said spool at different selected speeds which means includes
a shaft on which said drive gear is secured,
a first additional shaft,
a gear secured on said additional shaft in continuous engagement with said drive gear,
clutch members one of which is slidably engaged with the other and which is continuously operable with said gear on said first additional shaft,
a second additional shaft,
the other of said clutch members being secured to a gear on said second additional shaft,
said driving member having a gear driven thereby which is in continuous engagement with the gear on said second additional shaft, and
shiftable means for selectively directly and indirectly driving said drive gear according to the positioning of said shiftable means.

* * * * *